US012741485B2

(12) United States Patent
Spahr et al.

(10) Patent No.: US 12,741,485 B2
(45) Date of Patent: Sep. 22, 2026

(54) HUB, IN PARTICULAR FOR BICYCLES

(71) Applicant: DT SWISS INC., Grand Junction, CO (US)

(72) Inventors: Stefan Spahr, Lengnau (CH); Nicholas Omlin, Rapperswil (CH)

(73) Assignee: DT SWISS INC., Grand Junction, CO (US)

( * ) Notice: Subject to any disclaimer, the term of this patent is extended or adjusted under 35 U.S.C. 154(b) by 402 days.

(21) Appl. No.: 18/503,374

(22) Filed: Nov. 7, 2023

(65) Prior Publication Data

US 2024/0149616 A1 May 9, 2024

(30) Foreign Application Priority Data

Nov. 8, 2022 (DE) ..................... 10 2022 129 446.3

(51) Int. Cl.

*B60B 27/04* (2006.01)
*B60B 27/02* (2006.01)
*B62M 6/60* (2010.01)

(52) U.S. Cl.

CPC .......... *B60B 27/047* (2013.01); *B60B 27/023* (2013.01); *B62M 6/60* (2013.01)

(58) Field of Classification Search

CPC ............ B60B 27/0001; B60B 27/0005; B60B 27/023; B60B 27/047; B60B 27/0031; B60B 27/0078; B62M 6/60; F14D 41/36
USPC ........................................................... 301/6.5
See application file for complete search history.

(56) References Cited

U.S. PATENT DOCUMENTS 6,588,564 B1 7/2003 Jaeger et al.
8,936,144 B2 1/2015 Spahr et al.
10,442,245 B2 10/2019 Walthert
11,220,133 B2 1/2022 Walthert et al.
(Continued)

FOREIGN PATENT DOCUMENTS

CN 203344640 U * 12/2013
DE 102007026821 A1 12/2008
(Continued)

OTHER PUBLICATIONS

Examination Report received for German Application No. 10 2022 129 554.0, dated Mar. 5, 2024.
(Continued)

*Primary Examiner* — S. Joseph Morano
*Assistant Examiner* — Eva L Comino
(74) *Attorney, Agent, or Firm* — Greer, Burns & Crain, Ltd

(57) ABSTRACT

A hub for bicycles with a hub axle, a hub shell, a rotor and a freewheel device, wherein the hub shell rotates with a rotor-side hub bearing, and an outer hub bearing. The rotor rotates with a hub-side rotor bearing disposed closer to the hub shell and an outer rotor bearing further from the hub shell. The freewheel device includes hub-side and rotor-side toothed disk devices, each including an end toothing for engagement with one another, and biased to an engagement position (E). The end toothing of the hub-side toothed disk device is axially oriented to the rotor. The rotor-side toothed disk device is accommodated radially within the rotor and by an outer radial toothing, is coupled with an inner radial rotor toothing, to move with the rotor. The inner diameter of the rotor-side toothed disk device is larger than that of the hub-side rotor bearing.

18 Claims, 5 Drawing Sheets

(56) References Cited

U.S. PATENT DOCUMENTS

| | | | | |
|---|---|---|---|---|
| 11,400,754 | B2 | 8/2022 | Spahr et al. | |
| 2019/0225014 | A1* | 7/2019 | Walthert | F16D 41/24 |
| 2022/0032686 | A1 | 2/2022 | Goebel | |

FOREIGN PATENT DOCUMENTS

| | | | | | |
|---|---|---|---|---|---|
| DE | 102007063895 | B3 | | 12/2016 | |
| DE | 102015009041 | A1 | | 1/2017 | |
| DE | 102016115515 | A1 | | 2/2018 | |
| DE | 102018008586 | A1 | | 12/2018 | |
| DE | 102018101725 | A1 | | 7/2019 | |
| DE | 102020103129 | A1 | | 8/2021 | |
| EP | 1121255 | B1 | * | 4/2003 | B60B 27/047 |
| EP | 2221192 | A1 | | 8/2010 | |
| EP | 2559567 | A2 | * | 2/2013 | B60B 31/005 |
| EP | 2559569 | A2 | * | 2/2013 | B60B 27/023 |
| EP | 2599643 | B1 | | 11/2015 | |
| EP | 3275694 | A1 | * | 1/2018 | B60B 27/023 |
| EP | 3517315 | A1 | * | 7/2019 | B60B 27/023 |

OTHER PUBLICATIONS

European Search Report received for Application No. 23207409.6, dated Apr. 16, 2024.

German Search Report received for Application No. 10 2022 129 554.0, dated Jun. 19, 2023.

* cited by examiner 44 2a 68 70 60a 47 65 63 60 46 67 47a 70a 40 56 43 30 34 36 6 8 8c 66a 11c 62 69 19 60b 61 13 15 20 24 18 16 8 3 3b 30d 53 20d 4b 4 8b 8b 121 121a 123a 122a 123 122 148 147 141 143 142 143a 142a 141a 9 32 22 F 33 23 31 21 32b 22b 31a 21a 30b 30b 33b 23a,23b 23,33 20a,30a 20c,30c 33c 22a, 32a 20c 22,32 22b, 32b 21,31 23,33 20b,30b 23a,33a 41 40 43 40a 40b 42

HUB, IN PARTICULAR FOR BICYCLES

BACKGROUND

The present invention relates to a hub for vehicles and, in particular, bicycles, which in normal and regular proper use are at least partially muscle-powered, the hub comprising a hub shell, a rotor, a freewheel device and a hub axle. The hub shell and the rotor are supported for rotation with at least two roller bearings each. In the rotor and the hub shell the freewheel device is provided to connect the rotor with the hub shell, non-rotatable in the driving direction. While the user is not applying any driving force or while back-pedaling, the freewheel device enables a freewheeling state, in which the hub can continue rotating, while the rotor remains for example motionless.

Other than in bicycles, the hub may be used in other partially muscle-powered vehicles and two-wheeled vehicles, which are for example provided with an electric auxiliary drive. The hub is, in particular, used in sports bicycles. In all the configurations, the hub according to the invention is employed in vehicles and, in particular, bicycles which in normal and regular proper use are at least partially muscle-powered.

The prior art has disclosed various hubs comprising a freewheel, so that the pedal crank will not keep rotating along for example during a downhill ride. Thus, the prior art has disclosed hubs with ratchet freewheels where the pawls can radially pivot between a freewheel position and an engagement position. Suitable examples of such a hub are disclosed in commonly-owned U.S. Pat. Nos. 6,588,564 and 11,220,133, the contents of which are incorporated by reference herein. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation before rotational force is transmitted when pedaling is resumed.

EP 1 121 255 B1 has disclosed a hub with a toothed disk freewheel which reliably and very quickly transmits the driving force from the rotor to the hub shell. Friction loss is relatively low while the user is not actuating the pedals. The hub provides for reliable function, enabling applying even loads on the teeth of the toothed disks. To this end, this hub employs two toothed disks, each of which is axially movable, and which are axially urged toward one another from the outside, by way of a spring each. The two toothed disks are thus floatingly supported and for example in case of the hub flexing or other types of stresses, they may be oriented to one another to provide a particularly reliable operation.

EP 3 275 692 A1 (U.S. Pat. No. 10,442,245, incorporated by reference herein) to the applicant has disclosed a further development of such a lightweight hub with a toothed disk freewheel and a reliable function. In the hub, the toothed disk freewheel comprises a rotor-side freewheel component and a hub-side freewheel component, wherein the hub-side freewheel component is screwed into the hub shell, forming a bearing seat for a roller bearing accommodated therein for supporting the hub shell. Thus, the rigidity of the hub can be increased.

To still further increase the stability, DE 10 2020 103 129 A1 (U.S. Pat. No. 11,400,754, incorporated by reference herein) to the applicant has disclosed a hub with such a toothed disk freewheel, wherein the hub bearing disposed on the rotor side for supporting the hub shell is disposed in an area of the hub axle having an enlarged diameter. Thus, the stability can be increased, since the larger wall thickness of the hub axle can be selected considerably larger in the area of the hub bearing facing the rotor.

DE 10 2015 009 041 A1 has disclosed a hub in which a type of toothed disk freewheel is provided by means of coupling rings. The subject matter is, to provide a free fit design between the hub axle and the inner ring of a bearing, for ease of installation. Furthermore, a noise reduction member is employed to absorb the characteristic noises of a toothed disk freewheel. An attachment member in the hub axle interior spreads the hub axle in the area of a bearing, to provide a safe seat and ease of installation. The structure is complicated, due to the many different components.

It is therefore the object of the present invention to provide a lightweight hub, which enables a simple structure, high stability, and a very reliable function.

SUMMARY

A hub according to the invention is provided for at least partially muscle-powered vehicles and, in particular, bicycles, and comprises a hub axle which is, in particular, hollow, a hub shell, a rotor, and a freewheel device. The hub shell is supported for rotation with at least two hub bearings axially spaced apart from one another, namely, at least one rotor-side (axially inner) hub bearing disposed closer to the rotor, and at least one (axially) outer hub bearing, further distant from the rotor. The two hub bearings are (as a rule) disposed in end areas of the hub shell distant from one another. The rotor is supported for rotation with at least two axially spaced apart rotor bearings, namely, one hub-side rotor bearing disposed closer to the hub shell, and at least one (axially) outer rotor bearing further distant from the hub shell. The rotor bearings are (as a rule) preferably disposed in distant end areas of the rotor. A freewheel device is provided, comprising a hub-side toothed disk device coupled with the hub shell, and a rotor-side toothed disk device, interacting therewith and coupled with the rotor. The two toothed disk devices each comprise an end toothing for engaging with one another, and they are biased to an engagement position by means of at least one biasing device. The end toothing of the hub-side toothed disk device coupled with the hub shell is axially oriented to the rotor. The rotor-side toothed disk device is accommodated radially inside of the rotor and by way of an external radial toothing (on the rotor-side toothed disk device), it is coupled with the rotor to be non-rotatable in the driving direction, by means of an inner radial toothing in the rotor. The end toothing of the rotor-side toothed disk device is axially oriented to the hub shell. The clear inner diameter of the rotor-side toothed disk device is larger than the outer diameter of the hub-side rotor bearing.

The hub according to the invention has many advantages. A considerable advantage of the hub according to the invention consists in the simple structure and the high reliability. The clear inner diameter of the rotor-side toothed disk device is larger than the outer diameter of the hub-side rotor bearing, so that the hub-side rotor bearing can be supported closer to the hub shell. The fact that the rotor-side toothed disk device with an outer radial toothing is radially outwardly received and guided in an inner radial toothing in the rotor, improves reliability and operation. The toothed disk devices each surround the respective hub and rotor bearings. The rotor-side toothed disk device is guided very precisely by way of the large outer diameter, and it can be perfectly oriented to the hub-side toothed disk device. A malfunction due to jamming or the like can be prevented, or in some cases virtually excluded.

It is also very advantageous that the rotor-side toothed disk device is coupled with the rotor to be non-rotatable in the driving direction, and that the hub-side toothed disk device is coupled with the hub shell to be non-rotatable in the driving direction. This provides a simple structure and ease of installation, to largely avoid errors during installation. The hub-side toothed disk device is accommodated on the hub shell and has an end toothing which is oriented to the rotor. The rotor-side toothed disk device is accommodated on the rotor and has an end toothing facing the hub shell.

In a preferred specific embodiment, at least the end toothing of the rotor-side toothed disk device is radially accommodated (not only in the rotor, but also radially) inside of the hub shell (when the hub is in the properly installed condition). The rotor-side toothed disk device is, in particular, accommodated radially inside of the hub shell, at least at one third or half, or three quarters of the axial length, or even completely. Since the rotor-side toothed disk device is radially outside accommodated at least partially in the inner radial toothing of the rotor, this means that the rotor-side end of the hub shell protrudes at least over a portion from the hub-side end of the rotor. Consequently, the rotor-side toothed disk device is radially surrounded both by the rotor and also by the hub shell.

In particular, are the rotor-side toothed disk device, the hub-side rotor bearing and a rotor-side hub flange on the hub shell, located on a shared plane of cross section transverse to the axis of symmetry of the hub or transverse to the longitudinal extension of the hub axle. This allows a compact architecture combined with reliable function. The architecture is simple, enabling optimal transfer of the forces occurring. The hub axle, in particular, extends through the hub shell, the two toothed disk devices, and through the rotor, and preferably accommodates a limit stop at each of its ends.

In advantageous specific embodiments, the hub-side toothed disk device is accommodated radially within the hub shell, and is coupled with the hub shell by way of an outer radial toothing on the hub-side toothed disk device with an inner radial toothing in the hub shell to be non-rotatable in the driving direction.

Particularly preferably, both the hub-side toothed disk device and the rotor-side toothed disk device can be transferred (moved) from an engagement position to a freewheel position, each against the biasing force of at least one biasing device. It is particularly preferred that both the hub-side toothed disk device and the rotor-side toothed disk device are assigned to a biasing device each. For example, the biasing devices on the whole may comprise one or several mechanical or magnetic springs. If both the toothed disk devices are urged to one another from the outside or pulled to one another by a suitable mechanism, this enables a particularly reliable freewheeling function and provides the structural design of a high-quality hub.

If both the toothed disk devices are separately biased to an engagement position, any jamming or tilting or some other misaligning disorder to any of the toothed disk devices can be compensated by the other of the toothed disk devices. To this end, the two toothed disk devices are accommodated, in particular, floatingly. Thus, a three-dimensional tilting of any toothed disk device can be equalized by a corresponding three-dimensional tilting of the other of the toothed disk devices. Furthermore, when two separate biasing devices are employed, any malfunction of a biasing device may also be compensated. These measures considerably increase the reliability. Thus, in combination with the particularly large outer diameter of the radial toothings, a particularly reliable hub is provided. The high guiding quality due to the large outer diameters on the radial toothings results in only minor three-dimensional tilting. Optionally, such tilting is reliably compensated by the two biasing devices.

Particularly preferably, the clear inner diameter of the hub-side toothed disk device is larger than the outer diameter of the rotor-side hub bearing. This allows placement of the rotor-side hub bearing axially closer to the rotor. Thus, the rotor-side hub bearing and the hub-side rotor bearing can be disposed virtually immediately adjacent to one another. Then, the toothed disk devices surround the pertaining bearing radially outwardly.

Preferably, roller bearings, provided with a plurality of rolling members each, are employed for at least one hub bearing and for at least one rotor bearing. Preferably, deep-groove ball bearings are used, provided with an inner ring and an outer ring. A spacer is preferably provided between the rotor-side hub bearing and the hub-side rotor bearing. The spacer provided may for example be a thin disk or a short sleeve, to enable independent rotation of the pertaining outer ring of the relatively closely adjacent roller bearing.

In all the configurations it is particularly preferred for the hub shell with the hub bearings to be supported for rotation, in particular, immediately on the hub axle. It is likewise preferred for the rotor with the rotor bearings to be supported for rotation preferably immediately on the hub axle. It is also conceivable for a hub bearing or a rotor bearing to be disposed on a type of sleeve or the like, which in turn is accommodated or disposed on the hub axle.

In all the configurations it is particularly preferred for a central plane of cross section transverse to an axis defined by the axle to intersect the rolling members of the hub-side rotor bearing through the rotor-side toothed disk device. It is preferred for a central plane of cross section transverse to an axis defined by the axle to intersect the rolling members of the rotor-side hub bearing through the hub-side toothed disk device. A “central plane of cross section” is, in particular, understood to mean a mean or center plane of cross section located in the axial center of the pertaining toothed disk device. Such a central plane of cross section may for example extend in the axial direction, centrally through the radial toothing of the toothed disk device when the hub is in the idle position. In the idle position, the freewheel devices are in the engaged position, and as a rule, the two toothed disk devices are located in a central axial area, and they can be displaced in both axial directions against the biasing force of the biasing device.

In preferred configurations, the axial distance of the central plane of cross section through the rotor-side toothed disk device from the plane of cross section through the rolling members (plane of rolling member) of the hub-side rotor bearing, is smaller than the diameter of a rolling member and, in particular, smaller than the radius of a rolling member, and/or smaller than the minimum wall thickness of the hub axle. This enables a particularly efficient transfer of forces.

It is preferred for the axial distance of the central plane of cross section through the hub-side toothed disk device, from the plane of cross section through the rolling members of the rotor-side hub bearing, to be smaller than the diameter of a rolling member, and, in particular, smaller than the radius of a rolling member and/or smaller than the minimum wall thickness of the hub axle.

In preferred configurations, the outer diameter of the rotor-side toothed disk device is larger than the outer diameter of the sprocket accommodation. This permits a particularly reliable function and shows a particularly large toothed disk device, since the standardized sprocket accommodation has an outer diameter that is smaller than the outer diameter of the rotor-side toothed disk device. Particularly preferably, the outer diameter of the end toothing of the rotor-side toothed disk device is larger than the outer diameter of the sprocket accommodation. This clearly shows that the end toothing is located on a very large diameter and provides a large contact surface.

Particularly preferably, a plurality of teeth is provided, wherein the toothed disk may be configured with 48, 60, 72, 80, 90, 100, 110 or 120 or more teeth. For example, both the toothed disk devices may show the same quantity of for example 90 or 120 (+/−10) teeth. It is also conceivable for the number of teeth of the two toothed disk devices to be different, at any rate as long as the pitch and placement of each of the axial teeth on the end toothing is identical.

In all the configurations it is possible and preferred for the end toothing to be configured on an end face of a toothed disk device. The end face is, in particular, configured transverse and, in particular, perpendicular to the axis of rotation. Alternately it is possible for the end toothing to be configured as a bevel gear, thus showing an inclination to a plane perpendicular to the axis of symmetry. What is essential is, for the two toothed disk devices to be configured fitting and matching one another, to allow a permissible engagement of the pertaining tooth segments with one another.

Preferably, the hub-side toothed disk device shows an outer radial toothing which is in engagement with an inner radial toothing in the hub shell, relative to which it is axially movable. This means that the hub-side toothed disk device is axially movable relative to the internal toothing in the hub shell. The inner radial toothing in the hub shell does not need to be configured immediately in the hub shell, but it can for example be configured on a threaded ring which is accommodated in the hub shell and is, in particular, screwed into the hub shell.

A separate threaded ring allows in case of wear or the like to exchange the threaded ring only, while allowing continued use of the hub shell.

It is possible for the threaded ring to be manufactured from a stronger material than the hub shell. For example, the threaded ring may be manufactured of steel. Alternately it is possible for the threaded ring to be manufactured from a more lightweight material such as aluminum or titanium or a suitable alloy. In case that wear shows in the radial toothing in the threaded ring, it may be removed and exchanged as required.

In preferred specific embodiments, the threaded ring shows a central depression and, in particular, a centered depression on the axially outer surface. The central depression may be a conical depression. A conical portion configured on the end face of the rotor plunges into the central depression preferably contactless (in the properly installed condition). This allows a compact structure. Moreover, a (narrow) sealing gap may be configured between the conical portion and the conical depression.

Particularly preferably, the threaded ring is configured on the outer radial surface (considerably) wider in the axial direction than on the inner radial surface. This may be caused by the central depression, so that on the radial outside, the axial width is larger by at least 5% or 10% or preferably more than 15% or even 20%, than on the radial inside. The axial width, in particular, on the radial outside, is larger by 10% to 25%, than on the radial inside.

In preferred specific embodiments, the threaded ring shows, on the axially inner surface facing away from the rotor, a (conical) support portion resting against a correspondingly (conically) configured accommodation in the hub shell. A suitable, conical configuration of the support portion and the accommodation in the hub shell allows saving axial mounting space. A support portion configured orthogonal to the central axis of symmetry and a correspondingly orthogonal accommodation allow greater ease of manufacture.

In particular, does the external thread of the threaded ring extend axially outwardly beyond the hub-side toothed disk device, and extends up to radially beyond the rotor-side toothed disk device, which it overlaps at least partially. Such a configuration allows enlarging the plane of action of the threaded ring, while not requiring more mounting space in the axial direction.

Preferably, the external thread of the threaded ring comprises at least two separately configured and continuous thread grooves. Preferably, the internal thread in the hub shell comprises at least two separately configured and continuous thread grooves. Thus, a thread may be configured which allows a high bearing load while simultaneously requiring small axial forces during pedaling.

Basically, during riding, the driving force of the rider pushes the threaded ring further into the hub shell, since the driving force is transmitted through the outer radial toothing of the toothed disk device and the inner radial toothing to the threaded ring. Thus, a screw-in momentum is generated, which may result in the hub shell spreading. A multiple thread lowers the load in the hub shell when the same strength is applied, to prevent spreading of the hub shell.

In all the configurations, it is preferred that at least one toothed disk device comprises an engagement body on which the end toothing is configured over the radial height, and the radial toothing is configured over the axial length. The axial length of the radial toothing is, in particular, larger than the radial height of the end toothing. The axial length may, in particular, be at least 1.5 times the radial height. This provides a very reliable and precise axial guide for the toothed disk device.

In particular, is the axial extension of the engagement body larger than the diameter of a rolling member of a rotor bearing and/or a hub bearing. Preferably, the axial extension of the engagement body is larger than half or ⅔ of the axial width of a roller bearing and, in particular, larger than half or ⅔ of the axial width of the hub-side rotor bearing. The axial width of the engagement body is in particular at least 5 mm and preferably at least 6 mm. The axial width may, in particular, be between 4.5 mm and 8 mm. In a concrete configuration, the axial width of the radial toothing of a toothed disk device is 6.16 mm, while the clear inner diameter is between 25 mm and 35 mm, and in a concrete configuration, approximately 30 mm. The outer diameter (including the radial toothing) of the toothed disk device is preferably between 30 mm and 40 mm, and in a specific case, it may be 37.8 mm.

The threaded ring has, in particular, an axial length between 5 mm and 10 mm. Preferably, the axial length of the threaded ring is 7 mm (+/−1 mm). The outer diameter of the threaded ring may be between 35 and 45 mm and in a concrete example, approximately 44 mm. The clear inner diameter of the inner radial toothing in a concrete example is 30 mm.

The central depression or conical depression of the axially outer surface of the threaded ring preferably has an angle between 15° and 45°, and in a preferred configuration it may be approximately 30°. This results in a depth of the conical depression of for example 0.9 or 1 mm. Preferably, at the end face of the rotor, the conical portion has a correspondingly adapted angle. The angle may be identical, but it may also be different.

In preferred configurations, the axial length of the radial toothing is larger than the radial height of the end toothing and, in particular, larger by at least a factor of 1.5.

Preferably, the distance of the two central planes of cross section through the rotor-side toothed disk device and the hub-side toothed disk device is smaller than the axial width of the two toothed disk devices in the engaged state (or position). In particular, the distance of the two central planes of cross section through the rotor-side toothed disk device and the hub-side toothed disk device is smaller than twice the axial length of the radial toothing of an engagement body of at least one toothed disk device. It is possible and preferred for the distance of the two planes of cross section to be smaller than 1.2 times or 1 time the axial width of the threaded ring.

Particularly preferably, the hub-side toothed disk device and the rotor-side toothed disk device are configured substantially identical. This means that preferably, identical engagement bodies are employed for the two toothed disk devices. In particular, substantially the same or even identical biasing devices are used. Preferably, biasing springs are used. For example coil springs or conical coiled springs.

Further advantages and features of the present invention can be taken from the exemplary embodiments which will be discussed below with reference to the enclosed figures.

DETAILED DESCRIPTION

Figure 1:
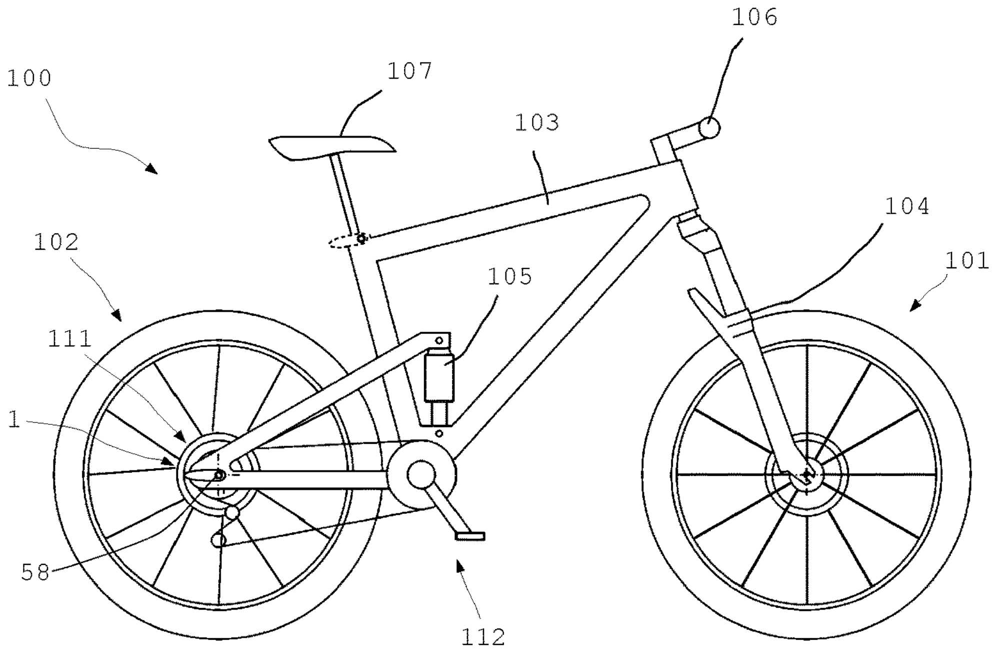
FIG. 1 a schematic illustration of a mountain bike.
Figure 2:
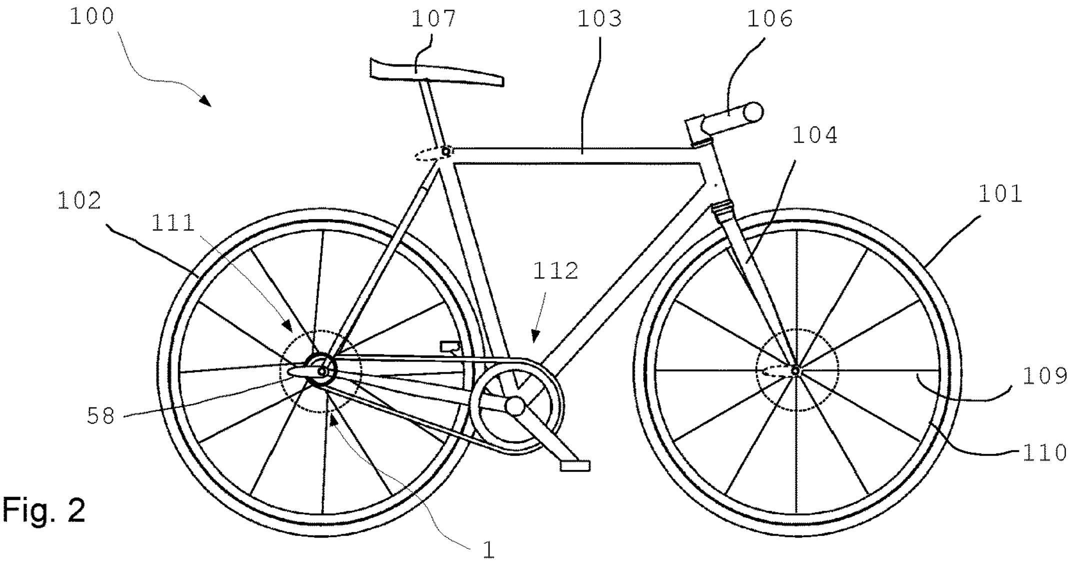
FIG. 2 a schematic illustration of a racing bicycle.

The FIGS. 1 and 2 illustrate a mountain bike respectively a racing bicycle 100 which are each equipped with a hub 1 according to the invention. The mountain bike or racing bicycle 100 is provided with a front wheel 101 and a rear wheel 102. The hub 1 according to the invention is used with the rear wheel 102. The two wheels 101, 102 comprise spokes 109 and a rim 110 and a sprocket assembly 111. Basically, conventional caliper brakes or other brakes such as for example disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals allows for driving. Optionally the pedal crank 112 and/or the wheels may be provided with an electrical auxiliary drive. The hub 1 of the wheels may be attached to the frame by means of a clamping mechanism 58 (for example a through axle or quick release).

Figure 3:
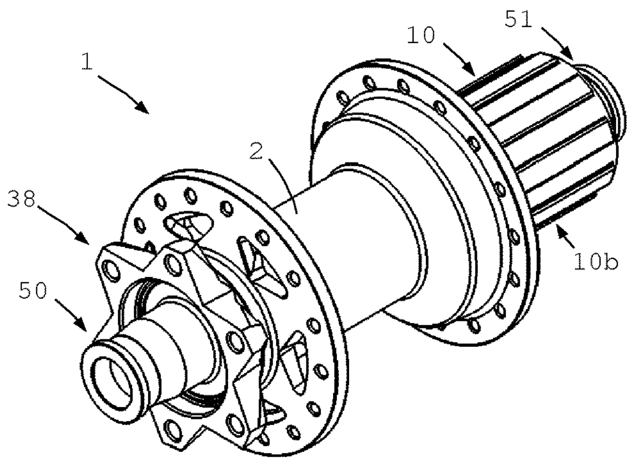
FIG. 3 a perspective illustration of a hub according to the application.
Figure 4:
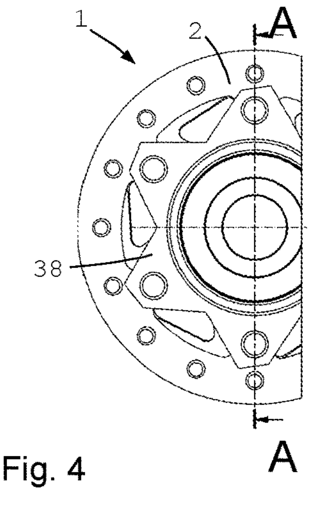
FIG. 4 a front view of the hub according to FIG. 3.

The hubs 1 inserted in the rear wheels 102 in the bicycles according to FIGS. 1 and 2 are shown in FIG. 3 in perspective, and in FIG. 4 in a front view.

The hub 1 comprises a hub shell 2 and a rotor 10, and a brake disk accommodation 38. The outer surface of the rotor 10 is provided with a sprocket accommodation 10*b* to accommodate a sprocket cluster having an appropriate quantity of sprockets. The two ends of the hub 1 are provided with limit stops 50, 51, presently shown pushed on, but they may optionally be pushed in or screw-fastened. As can be seen, the limit stops 50, 51 are configured hollow and serve to accommodate a clamping axle 59 with which to fasten the hub 1 to the frame.

Figure 5:
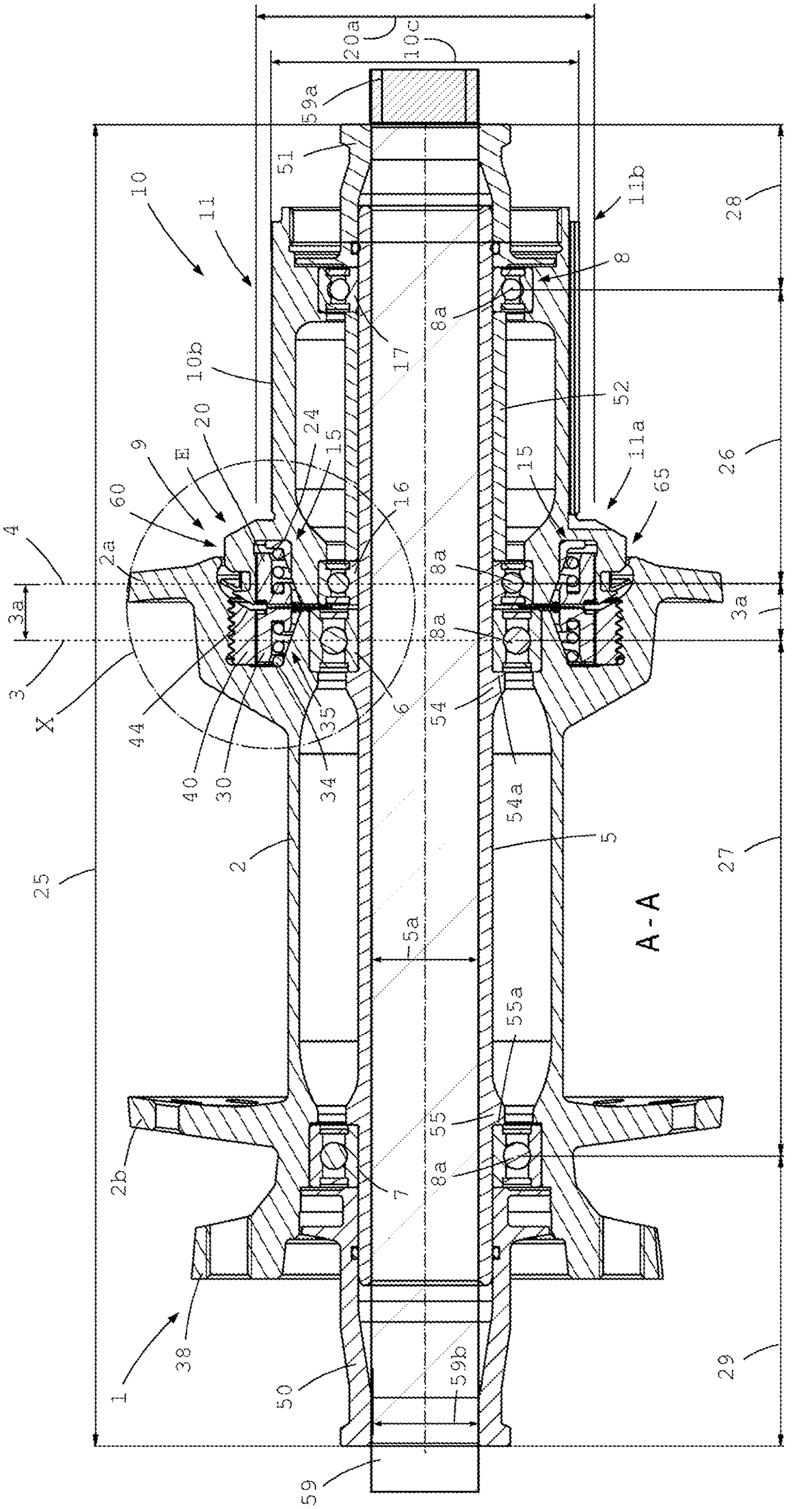
FIG. 5 a cross section A-A through the hub according to FIG. 4.

FIG. 5 shows the cross section A-A of FIG. 4. The hub 1 presently has a fitted length 25 of 148 mm. The hub 1 comprises the hollow hub axle 5, on which the hub shell 2 is supported for rotation by way of the hub bearings 6 and 7. The rotor 10 is presently supported for rotation immediately on the hub axle 5, likewise by way of the roller bearings 16 and 17.

On the hub axle 5, closer to the rotor 10, a bulge 54 with a radial shoulder 54*a* is configured, and at the outer end beneath the hub flange 2*b*, a bulge 55 with a radial shoulder 55*a* is configured. The rotor-side hub bearing 6 rests against the radial shoulder 54*a*, and the outer hub bearing 7 disposed at the other end of the hub shell 2 rests against the shoulder 55*a* of the hub axle 5. Axially outwardly, the limit stop 50 follows the outer hub bearing 7, which is presently pushed onto the hub axle 5, and seals the hub shell to the outside by means of a double flange protruding outwardly.

Toward the rotor 10, the rotor-side hub bearing 6 is followed by a (thin, and presently disk-shaped) spacer 53 and thereafter, by the hub-side rotor bearing 16. Between the hub-side rotor bearing 16 and the outer rotor bearing 17, a sleeve 52 acting as a spacer is pushed onto the hub axle 5. Axially outwardly, the limit stop 51 follows the outer rotor bearing 17. The hub 1 is fixedly clamped into the frame.

The hollow hub axle 5 shows an inner clear diameter 5*a* which, depending on the configuration, may be 12 mm, 15 mm, or 16 mm or 17 mm or more. A clamping axle 59 of a clamping mechanism 58 can be pushed through the hollow hub axle 5 for attaching the hub 1 to the frame of a bicycle. At one of its ends, the clamping axle 59 may comprise for example an end piece 59*a* with an external thread, with which to screw the clamping axle 59 into a suitable thread on the frame. At the other of its ends, a corresponding clamping mechanism may be provided, to reliably accommodate and clamp the hub 1 to a frame.

The outer diameter 59*b* of the clamping axle 59 and the inner diameter 5*a* of the hollow hub axle 5 are matched to one another such that on the one hand, a (relatively) unimpeded passage of the clamping axle through the hollow hub axle 5 is enabled, while on the other hand, the hollow hub axle 5 can also be supported on the clamping axle 59 in operation, if the loads applied result in local deflection. In this way, the stability of the hub 1 on the whole is increased.

Alternately it is also possible to omit this additional support. Then, a clamping axle 59 is employed, showing a noticeable radial distance between the hub axle 5 and the clamping axle 59 over large parts of the hub axle 5, to not at all, or to a very minor extent, affect the insertion or removal of the clamping axle.

According to the application, the hub bearings 6 and 7 and also the rotor bearings 16 and 17 are each configured as roller bearings 8, each comprising a plurality of rolling members 8. In this exemplary embodiment, all the roller bearings are configured as deep-groove ball bearings.

The hub 1 is fixedly clamped into the frame in the axial direction. Then, the force flow runs for example from what is the left end in FIG. 5, through the limit stop 50, the inner bearing ring of the outer hub bearing 7, and over the shoulder 55*a* of the bulge 55 into the hollow hub axle 5. From there, the introduced force is guided over the shoulder 54*a* of the bulge 54 into the inner bearing ring of the hub bearing 6 and through the spacer 53 between the rotor-side hub bearing and the hub-side rotor bearing 16. From there, the force enters into the inner bearing ring of the hub-side rotor bearing 16 and is guided over the sleeve 52 to the inner bearing ring of the outer rotor bearing 17 and from there through the limit stop 51, back into the frame. The hub shell 2 and the rotor 10 are radially and axially retained by way of the deep-groove ball bearings.

On the rotor side, the hub shell 2 has a hub flange 2*a*, and on the other side, a hub flange 2*b*. The spokes can be attached to the hub flanges 2*a*, 2*b*. Opposite the rotor 10, the other, outer hub end is provided with the brake disk accommodation 38.

Radially within the rotor-side hub flange 2*a*, a threaded ring 40 is screwed into the hub shell, comprising an inner radial toothing 43 in which the hub-side toothed disk device 30 is inserted. On the hub-side end of the rotor 10, radially within the end portion 60, the rotor-side toothed disk device 20 of the freewheel device 9 is inserted. The end portion 60 extends from the hub-side end 60*a* on the hub-side end face 10*a* axially outwardly, through to the other, outer end 60*b*.

Both the rotor-side toothed disk device 20 and the hub-side toothed disk device 30 comprise an outer radial toothing 23, 33 each, meshing with corresponding inner radial toothings 43 in the threaded ring 40 and in the interior of the end portion 60. Thus, the rotor-side toothed disk device 20 and the hub-side toothed disk device 30 are non-rotatably coupled with the rotor 10 respectively the hub shell 2.

Figure 11A:
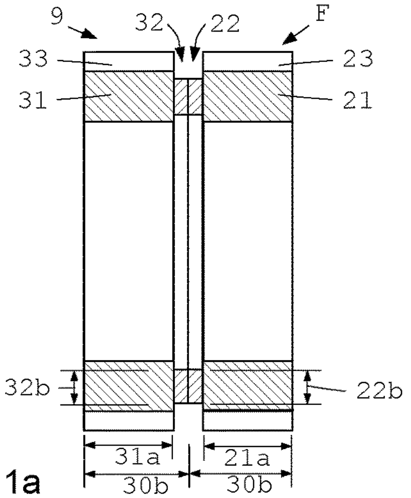
FIGS. 11*a, b* schematic views of a freewheel device and the toothed disk device for a hub according to the application.

At the same time, both of the toothed disk devices 20, 30 can each be moved in the axial direction between an engagement position E (FIG. 5) and a freewheel position F (FIG. 11*a*). Due to the end toothing respectively helical toothing, the oblique tooth faces of the end toothing slip off each other during backpedaling, urging the toothed disk devices 20, 30 apart in the axial direction. When driving force is applied, the end toothings re-engage with one another.

The toothed disk device 20 is biased by way of the biasing device 24, presently in the shape of a cylindrical coil spring, in the engagement position E illustrated. Correspondingly, the toothed disk device 30 is axially biased in the engagement position E, by way of a biasing device or pre-tensioning device 34, which is presently again configured as a cylindrical coil spring. Presently, this means that the hub-side toothed disk device 30 is biased in the direction toward the rotor, while the rotor-side toothed disk device 20 is biased in the direction toward the hub shell 2, by means of the biasing device or pre-tensioning device 24. The action of the biasing device can be effected by means of mechanical springs, or magnetic springs, or pneumatically.

The rotor 10 comprises a rotor body 11, extending from the hub-side end 11*a* to the opposite, outer end 11*b*. On the outer surface of the rotor body 11 the sprocket accommodation 10*b* is provided. This is where a sprocket or several sprockets, or a sprocket cluster can be attached.

On the hub-side end 11*a*, the end portion 60 having an enlarged diameter is configured. Inside of the end portion 60 the rotor-side toothed disk device 20 is accommodated, which comprises an outer diameter 20*a* which is larger than the outer diameter 10*c* of the sprocket accommodation 10*b* of the rotor body 11. The outer diameter 30*a* corresponds to the outer diameter 20*a*. The axial widths 20*b* and 30*b* are likewise identical.

As can be clearly seen in FIG. 5, the planes of rolling member respectively planes of cross section 3, 4 extending transversely to an axis defined by the axle each also intersect the toothed disk devices 20, 30 (through the rolling members 8*a* of the rotor-side hub bearing 6 and the hub-side rotor bearing 16). It can be seen that the plane of rolling member respectively plane of cross section 4 runs through the hub-side rotor bearing 16, the biasing device 24, and the radial toothing of the rotor-side toothed disk device 20, and through the hub flange 2*a* of the hub shell. Furthermore, a sealing unit 68 disposed radially outwardly on the end portion 60 is intersected by the plane of cross section respectively plane of rolling member 4.

Such a configuration, in which the planes of cross section respectively planes of rolling member 3 and 4 intersect the engaging portions of the radial toothings of the two toothed disk devices and each of the assigned roller bearings 6, 16, offers an optimal transfer of the loads occurring in operation. The distance 26 of the two rotor bearings 16, 17 may be selected very large, since the rotor-side toothed disk device 20 is disposed radially outwardly of the hub-side rotor bearing 16, surrounding it radially. The distance 27 of the two hub bearings 6, 7 may likewise be selected very large, since the hub-side toothed disk device 30 is also disposed radially outwardly of the rotor-side hub bearing 6, surrounding it radially.

The clear inner diameters 20*c*, 30*c* of the two toothed disk devices are (considerably) larger than the outer diameters of the pertaining roller bearings 6, 16. The clear inner diameters 20*c*, 30*c* (see FIG. 6) are considerably larger, since on the outer diameters 6*b*, 16*b*, the roller bearings 6, 16 each support an inner wall 18, 36 of the rotor 10 respectively the hub shell 2, which extend toward one another finger-like beneath the accommodations 15, 35.

The accommodation 15, in which the rotor-side toothed disk device 20 is non-rotatably received, is configured radially outside of the inner wall 18 at the rotor. The accommodation 35, in which the hub-side toothed disk device 30 is non-rotatably received on the threaded ring 40, is configured radially outside of the inner wall 36 in the hub shell.

When the mounting width 25 is for example 148 mm, this structural design allows a distance 27 of the two hub bearings between 55 mm and 60 mm, and presently specifically for example 57 mm. The distance 3*a* of the two planes of cross section 3, 4 may be very narrow, and may presently be for example 7 mm, 8 mm or 9 mm. The distance 26 of the two rotor bearings 16, 17 may be between 27 mm and 35 mm, and presently it is for example 32 mm. The distance 28 may be 18 mm, and the distance 29 may be 33 mm.

Figure 6:
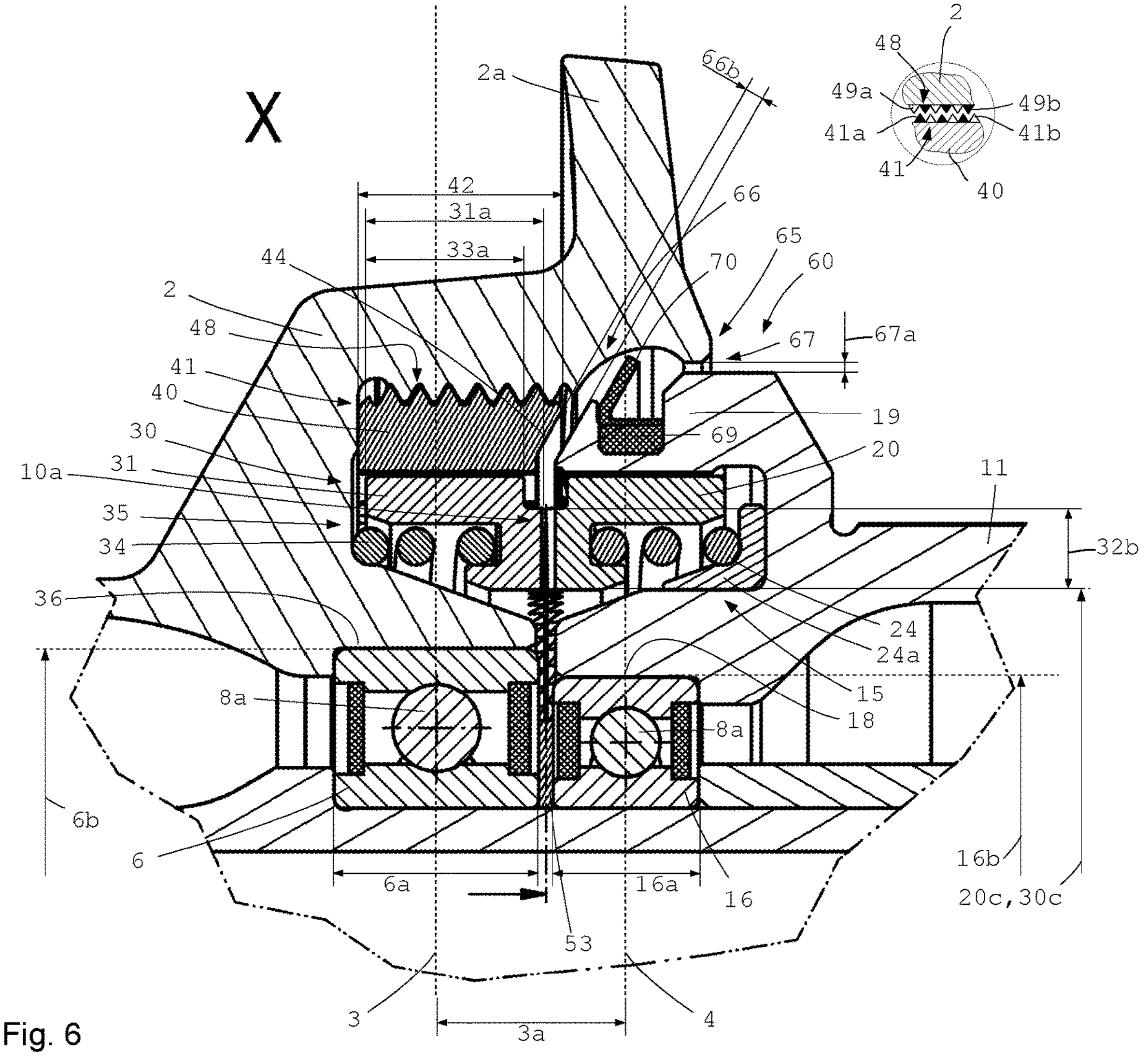
FIG. 6 an enlarged detail "X" from FIG. 5.

FIG. 6 shows the enlarged detail X from FIG. 5. On the hub axle 5 one can recognize the rotor-side hub bearing 6 having a width 6*a* and its hub-side rotor bearing 16 having a width 16*a*, between which a thin spacer 53 can be seen. The spacer 53 decouples from one another the two outer bearing rings of the bearings 6, 16. The width of the spacer 53 is narrower than half or a quarter or an eighth of the axial width 16*a* of the hub-side rotor bearing 16.

The rotor-side hub bearing 6 supports a wall 36 of the hub shell 2, which extends finger-like and, in particular, wedge-like or tapered toward the rotor 10, surrounding the rotor-side hub bearing 6 radially outwardly. The hub shell 2 is supported by the wall 36. The accommodation 35 is configured radially around, accommodating the hub-side toothed disk device 30. The hub-side toothed disk device 30 is biased by the biasing device 34 in the engagement position E.

The toothed disk device 30 comprises an outer radial toothing 33 (see FIG. 11*b*), which meshes with an inner radial toothing 43 (see FIG. 12*a*) in the threaded ring 40. The threaded ring 40 is screwed into the internal thread 48 in the hub shell 2 by way of the external thread 41.

On the hub-side end face 10 of the rotor 10, an accommodation 15 is configured in which the rotor-side toothed disk device 20 is accommodated. The rotor-side toothed disk device 20 comprises an end toothing 22 oriented to the hub shell. The end toothing 22 meshes with the end toothing 32 on the hub-side toothed disk device 30. The toothed disk devices 20, 30 are each axially urged to one another by means of the biasing devices 24, 34.

The holder respectively insert 24*a*, in the accommodation 15 on the hub-side end face 10 of the rotor 10, enables the use of identical toothed disk devices 20, 30, to provide for ease of installation, since confusion can be excluded. In terms of manufacturing technique, the accommodation 15 must be configured enlarged, to allow manufacture of the inner radial toothing 13 in the end portion 60 of the rotor 10. The conditions in the accommodations 15, 35 are identical.

The axial width 33*a* of the radial toothing 33 of the hub-side toothed disk device 30 and the (preferably) identical axial width 23*a* of the radial toothing 23 of the rotor-side toothed disk device 20, may, in particular, be larger than the axial width 16*a* or the axial width 6*a* of the roller bearing 6 respectively 16.

Figure 12A:
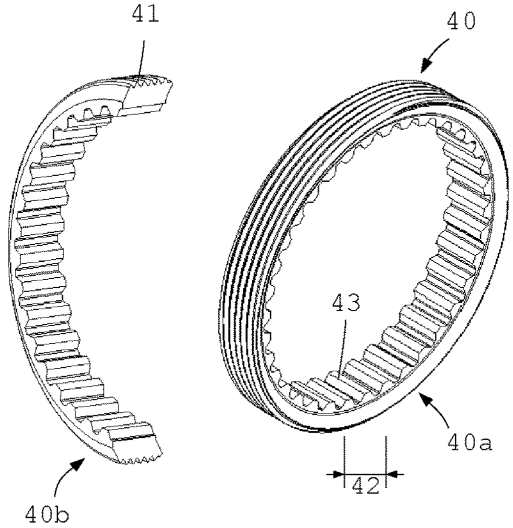
FIGS. 12*a-c* a schematic perspective view and schematic cross sections of a threaded ring for a hub according to the application.
Figure 12B:
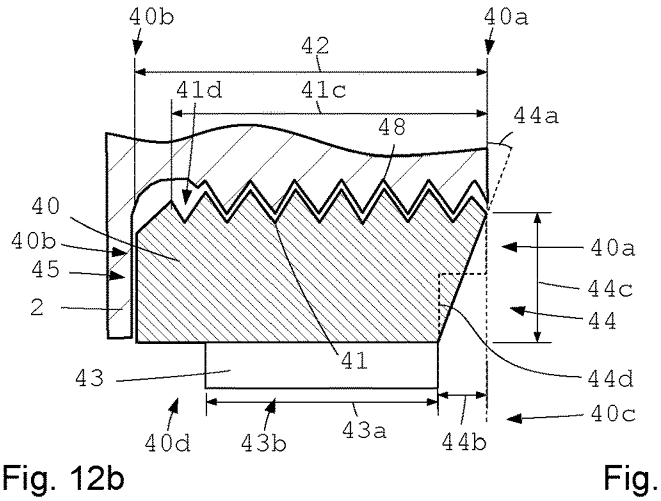

The axial width 42 of the threaded ring 40 is larger on the radial outside, since on the rotor side, the threaded ring has a central depression 44, which is presently configured as a conical depression respectively chamfer 44 (see FIG. 12*b*). This enlarges the thread length of the external thread 41, thus increasing the stability.

The engagement body 21, 31 of the rotor-side toothed disk device 20 and the hub-side toothed disk device 30 each comprise a radial toothing 23, 33 over an axial length 23*a* respectively 33*a*, which is clearly larger than the radial height 22*b* respectively 32*b* of the end toothing 22 respectively 32. This provides a precise guide for the two toothed disk devices in the axial direction. The axial length 21*a*, 31*a* of the engagement bodies 21, 31 is larger by the axial width of the end toothings.

The threaded ring 40 may be screw-connected with the hub shell 2 by means of a multiple thread. FIG. 6 shows on the top right an optional configuration, wherein two continuous and separate thread grooves 41*a* and 41*b* are screw-connected with corresponding thread grooves 49*a* and 49*b* in the hub shell 2.

The sealing device 65 for sealing the freewheel device 9 against environmental influences comprises a nearly horizontally configured (outer) narrow sealing gap 67 having a low radial height respectively clear dimension 67*a* of less than 0.5 mm. The outer sealing gap 67 extends between an enlarged diameter area 63 at the end portion 60 and a radially inwardly protruding wall 46 at the hub shell 2.

From there axially inwardly, a groove 62 is configured radially outside on the end portion 60, which accommodates a sealing unit 68 with a ring portion 69. An elastic sealing lip extends from the ring portion 69 obliquely outwardly out of the groove 62, so that a V-shaped cross section results between the ring portion 69 and the elastic sealing lip 70, which is opened axially outwardly toward the outer sealing gap 67. The sealing lip 70 protrudes into a peripheral groove 47 (see FIG. 8).

Axially further inwardly, a conical gap 66*a* respectively cone gap follows, having a clear gap width 66*b*. Overall, the sealing device 65 therefore comprises three sealing gaps, firstly the cone gap 66*a*, then the gap between the elastic sealing lip 70 and the wall of the sealing groove 47 in the hub shell, and the outer sealing gap 67 between the outer wall 19 in the enlarged diameter area 63 on the end portion 60 of the rotor 10.

FIG. 6 once again clearly shows that the plane of cross section 4 extends through the rolling members 8*a* of the hub-side rotor bearing 16, through the radial toothing 23, and through the sealing unit 68, and the rotor-side hub flange 2*a*. The hub-side rotor bearing 16 supports the inner radial wall 18 of the rotor body 11. On the radial outside thereof, the accommodation 15 is disposed in which the rotor-side toothed disk device 20 is non-rotatably accommodated, coupled with the rotor 10.

The simple structure reliably prevents errors in installation.

Figure 7:
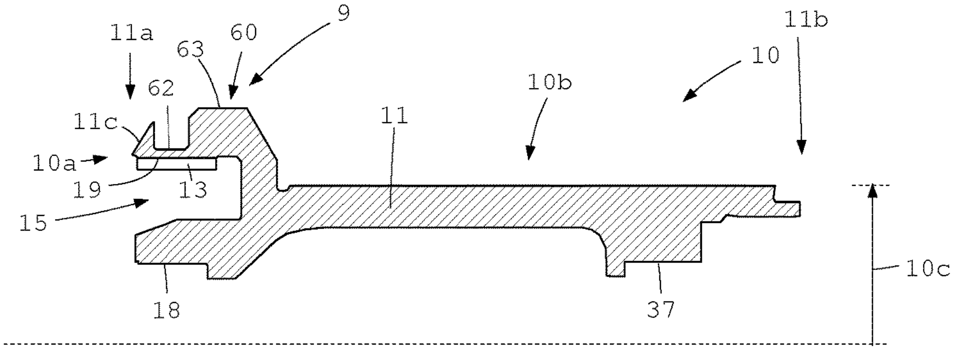
FIG. 7 a schematic, cross sectional view of the rotor of the hub according to FIG. 5.

FIG. 7 shows a schematic cross section through the rotor body 11 of the rotor 10, which extends from the hub-side end 11*a* toward the outer end 11*b*. On the outer surface of the rotor body 11, the sprocket accommodation 10*b* is provided, showing an outer diameter 10*c* which is smaller than the diameter of the inner radial toothings 13 on the accommodation 15 for the rotor-side toothed disk device 20.

The enlarged diameter area 63, which provides a wall of the sealing gap 67, is located on the end portion 60. The sealing unit 68 can be disposed in the peripheral groove 62. On the hub-side end 11*a*, the conical portion 11*c* is configured, forming, together with the conical depression 44 on the threaded ring 40, the inner sealing gap 66 respectively cone gap 66*a*. On the radial inside, the inner radial wall 18 can be seen, against which the rotor 10 is supported on the hub-side rotor bearing 16.

Figure 8:
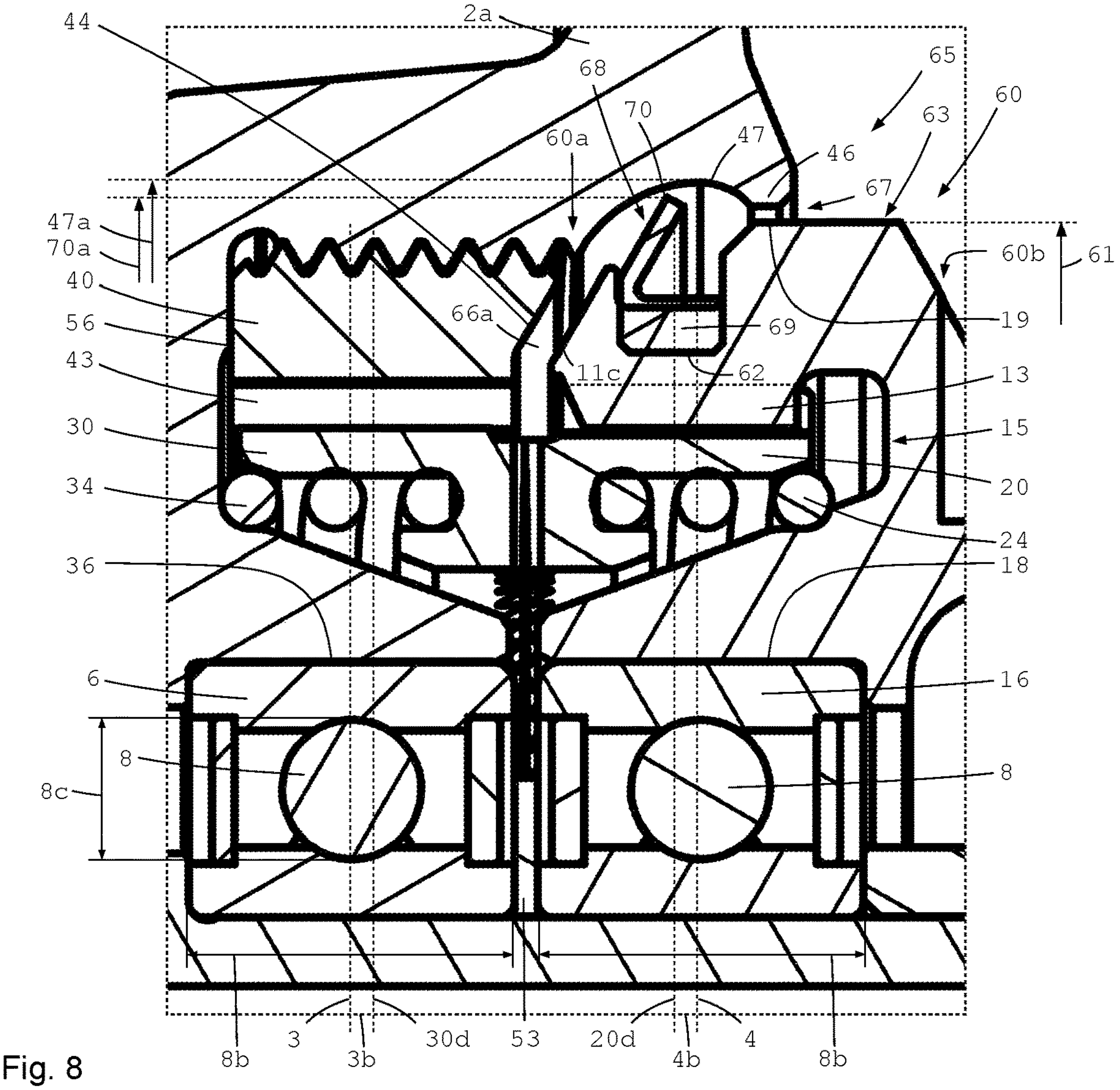
FIG. 8 an enlarged detail of a variant of a hub according to the application.

FIG. 8 shows an enlarged detail of a variant of FIG. 6, wherein, unlike the configuration according to FIG. 5, identically sized roller bearings 6, 16 (with identical widths 8*b*) are used as the hub-side rotor bearing 16 and the rotor-side hub bearing 6. This further facilitates installation and storage, since the quantity of different parts is further reduced. Again, the rotor-side toothed disk device 20 is accommodated in the accommodation 15 of the rotor body 11. The inner radial toothing 13 on the outer wall 19 guides the radial toothing 23 of the rotor-side toothed disk device 20 in the axial direction. The biasing device 24 urges the end toothing 22 in the direction toward the hub shell.

The outer diameter 70*a* of the elastic sealing lip 70 is larger than the outer diameter 61 of the outer sealing gap 67. This results in that water penetrating axially through the sealing gap 67 causes deformation of the sealing lip 70, so that it rests (more forcefully) against the wall of the sealing groove 47, obtaining a still higher sealing effect.

The central plane of cross section 20*d* (central plane of toothed disk) through the radial toothing 23 of the rotor-side toothed disk is only distant by a slight distance 4*b* from the plane of cross section 4 (plane of rolling member) through the rolling members 8*a* of the hub-side rotor bearing 16. The distance 4*b* between the planes of cross section 20*d* and 4 is, in particular, less than half the diameter respectively the radius of a rolling member 8, and particularly preferably it is also less than the smallest wall thickness of the hollow hub axle 5. This applies accordingly for the central plane of cross section 30*d* through the axial center of the radial toothing of the rotor-side toothed disk device 30. Again, the distance 3*b* between the two planes of cross section 3 (plane of rolling member) and 30*d* (central plane of toothed disk) is very small and, in particular, smaller than half the diameter or half the radius of a rolling member 8*a* of the rotor-side hub bearing 6.

The central plane of cross section 20*d* through the radial toothing 23 intersects the rolling members 8*a* of the hub-side rotor bearing 16. The central plane of cross section 30*d* through the radial toothing 33 also intersects the rolling members 8*a* of the rotor-side hub bearing 6. This effectively allows transferring the highest forces. The distances 3*b* and 4*b* are very small and smaller than half the diameter 8*c* or even half the radius of the rolling members 8*a*.

Figure 9:
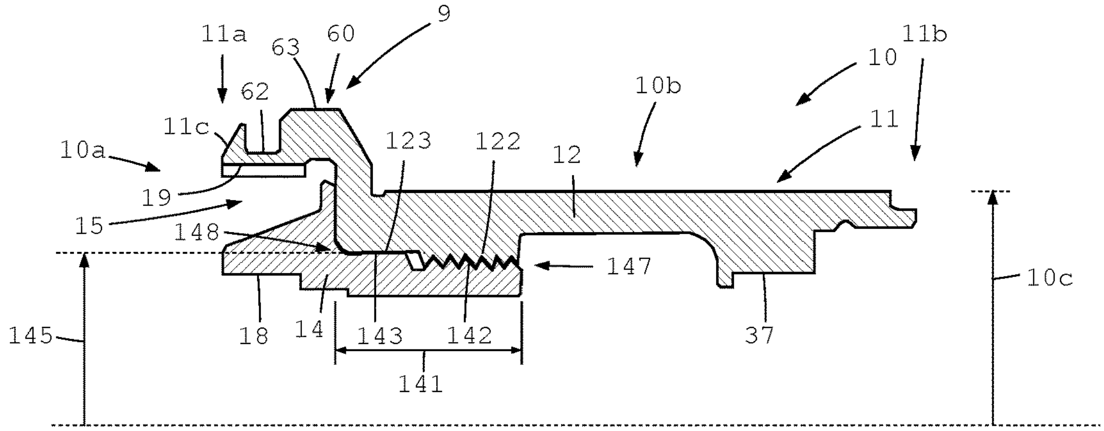
FIG. 9 a schematic, cross sectional view of a two-piece rotor for a hub according to the application.

FIG. 9 shows a modification of the rotor 10, presently consisting of two rotor parts 12 and 14. The rotor body 11 comprises a first rotor part 12, which provides the sprocket accommodation 10*b*. Furthermore the wall 37 is configured on the first rotor part 12, by means of which wall the rotor 10 is supported on the hub axle 5 by way of the outer rotor bearing 17. The inner radial wall 18 is configured on the second rotor part 14, by means of which wall the rotor 10 is supported on the hub-side rotor bearing 16 for rotation around the hub axle 5.

The second rotor part 14 is screw-connected with the first rotor part 12. To provide aligned guiding and concentric running, which is, in particular, important for the rotor, the first rotor part 12 and the second rotor part 14 each comprise a connecting area 121 (FIG. 10) and a connecting portion 141. The connecting area 121 comprises a threaded area 122 and a guiding area 123. The connecting portion 141 comprises a threaded portion 142 and a guiding portion 143. The guiding portion 143 has a diameter 145.

A length 141*a* of the connecting portion 141 of the second rotor part 14, in particular, corresponds to at least ¼ or ⅓ of the length 14*a* of the second rotor part 14, in particular, between a quarter and half of the length of the rotor body 11.

The ratio of the length 143*a* of the guiding portion 143 to the diameter 145 of the guiding portion 143 is higher than 1:10. Preferably, the ratio of the length 143*a* of the guiding portion 143 to the length 141*a* of the connecting portion 141 is higher than 1:4.

In the installed condition, the threaded area 122 and the threaded portion 142 are screw-connected. The required centering is effected by the guiding area 123 and the guiding portion 143. The radial tolerance in the guiding portion 143 is less than the radial tolerance between the threaded area 122 and the threaded portion 142.

Figure 10:
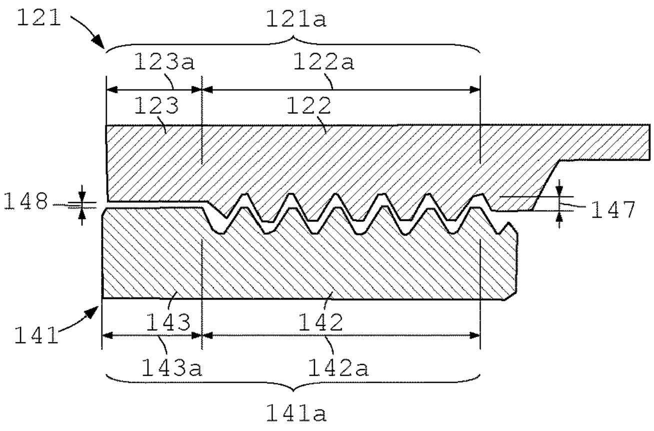
FIG. 10 a schematic detail of the two-piece rotor according to FIG. 9.

FIG. 10 shows the interaction of the connecting area 121 and the connecting portion 141 in an enlarged, schematic illustration. The connecting area 121 extends over a length 121*a*, which is composed of the length 122*a* of the threaded area 122 and the length 123*a* of the guiding area 123.

Accordingly, a connecting portion 141 is configured on the second rotor part 14, extending over a length 141*a*. The connecting portion 141 is composed of the threaded portion 142 and the guiding portion 143, which extend over a length 142*a* respectively 143*a*. The threaded area 122 (respectively the threaded portion 142) has a narrower tolerance 148 than does the screw-connected guiding area 123 (respectively guiding portion 143) having a tolerance 147. This provides high precision and repeatability of the radial orientation of the rotor 10.

Figure 11B:
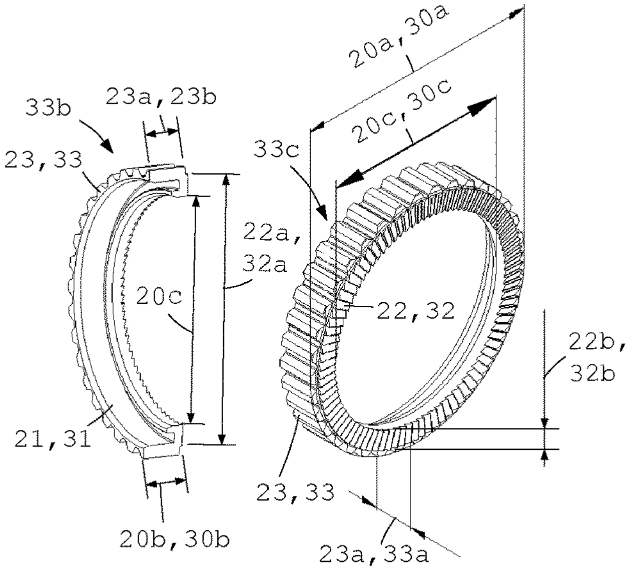

FIGS. 11*a* and 11*b* show the toothed disk devices 20, 30, presently identical, each having an engagement body 21, 31 and an end toothing 22, 32, and an outer radial toothing 23, 33. The outer radial toothings 23, 33 extend in the axial direction over an axial length 23*a*, 33*a*. The axial extension 21*a*, 31*a* of the engagement bodies 21, 31 is, at least by the axial width of the end toothings 22, 32, larger than the axial length 23*a*, 33*a* of the outer radial toothings 23, 33. The clear inner diameter 20*c* is larger than the outer diameter of the roller bearings 6, 16. The outer diameter 22*a*, 32*a* is larger than the outer diameter 10*c* of the sprocket accommodation 10*b*.

The number of teeth of the end toothing is preferably higher than 72, and it may be 90, 100, 110 or 120 or more.

The outer radial toothings 23, 33 of the toothed disk devices 20, 30 and the inner radial toothings 13, 43 preferably have between 20 and 60 radial teeth. In this exemplary embodiment, the toothed disk devices 20, 30 comprise approximately 36 radial teeth.

The radial extension 22*b*, 32*b* of the end toothings 22, 32 is less than the axial length 23*a*, 33*a* of the radial toothings 23, 33.

Figure 12C:
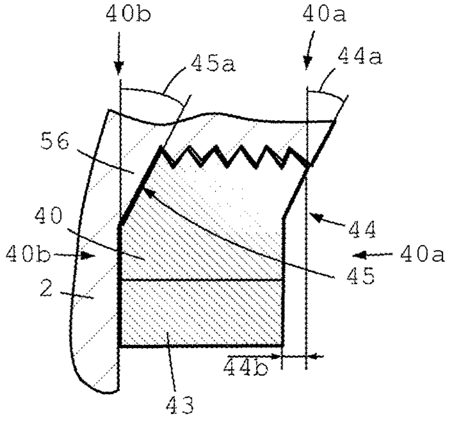

The FIGS. 12*a*, 12*b* and 12*c* show variants of the threaded ring 40, each comprising an axial width 42, and on the outer periphery, comprising a preferably multiple thread, with which to screw the threaded ring into a corresponding thread in the hub shell 2.

At the rotor-side end 40*a* of the threaded ring 40, a central depression 44, presently in the shape of a chamfer respectively conical depression 44, is configured running at an angle 44*a* of for example 30° and comprising a depth 44*b*.

The threaded ring 40, when properly mounted, is screwed into the hub shell 2. The hub-side toothed disk device 30 of the freewheel device 9 is accommodated therein. The end toothing 32 faces in the direction of the rotor 10 and is biased in the engagement position (E) by means of a biasing device 24.

The threaded ring 40 has an outer contour 41*d* with an external thread 41, and comprises a central through hole 40*c* with an inner contour 40*d*. The inner contour 40*d* comprises a non-round inner coupling contour 43*b*, which is non-rotatably coupled in the driving direction with a matching non-round outer coupling contour 33*b* on the outer periphery 33*c* of the hub-side toothed disk device 30. The inner coupling contour 43*b* may extend over the entire length or only part of the length of the inner contour 40*d*.

The threaded ring 40 has a central depression 44 at the rotor-side end 40*a*, so that the external thread 41 on the threaded ring 40 extends in the direction to the rotor 10 axially further outwardly than does the inner coupling contour 43*b*. This widens the external thread 41 of the threaded ring 40 in the direction toward the rotor 10. An improved accommodation of the threaded ring 40 in the hub shell 2 is possible. The strength is improved. The external thread 41 is extended.

Thus, the axial length 41*c* of the external thread 41 is larger than the axial length 33*a* of the coupling structure, which comprises the inner coupling contour 43*b* and the outer coupling contour 33*b*. The threaded ring 40 is screwed into the internal thread 48 of the hub shell 2 by means of the external thread 41.

The hub-side toothed disk device 30 is accommodated radially within the threaded ring 40 by way of the coupling structure 33*b*, 43*b*, non-rotatably in the driving direction and axially movable. At the rotor-side end 40*a*, the threaded ring 40 has a central, and presently centered, depression 44. The axial width 41*c* of the external thread 41 is wider than the axial width 33*a* of the coupling structure.

In the variant according to FIG. 12*b*, the central depression 44 is configured as a conical depression. In all the exemplary embodiments, the depression 44 has an axial depth 44*b* of at least 5% (and, in particular, at least 10%) of the axial width 42 of the threaded ring 40. The axial length 41*c* of the outer contour 41*d* of the threaded ring 40 is larger than the axial length 43*a* of the inner radial toothing 43 (which is the inner coupling contour 43*b*).

The axial depth 44*b* of the central depression 44 is between 5% and 25% of the axial width 42 of the threaded ring 40, and preferably between 10% and 20% of the axial width 42 of the threaded ring 40. The axial depth 44*b* of the central depression 44 is preferably between 0.5 mm and 3 mm.

In all the configurations, the central depression 44 may be stepped and for example configured as a stepped depression 44*d*, as is for example indicated in broken lines in FIG. 12*b*. Also possible is, a stepped and conical configuration. Preferably, the central depression 44 is configured conical or convex as a centric chamfer. An angle or cone angle 44*a* of the (conical) depression 44 to a plane transverse to the axis of symmetry of the hub or hub axle, is, in particular, between 5° and 30°.

In the exemplary embodiment, the inner coupling contour 43*b* comprises, or is configured as, an inner radial toothing 43 on the threaded ring 40. The outer coupling contour 33*b* on the hub-side toothed disk device 30 comprises, or is configured as, an outer radial toothing 33. In the mounted condition, a conical portion 11*c* configured on the end face 10*a* of the rotor 10, plunges contactless into the central depression 44 on the threaded ring 40. A sealing gap is configured in-between.

At the other end 40*b*, a conical support portion 45 may be configured (see FIG. 12*c*), extending at the conical angle 45*a* (for example) 30°. Such a conical support portion 45 allows saving axial mounting space. Alternately it is possible to configure the support portion 45 perpendicular to the axis of symmetry. This facilitates manufacture.

Overall, an advantageous hub 1 which is simple in structure is provided. The hub 1 is easy to assemble and comprises a relatively small number of parts. High stability is achieved. A high number of teeth of the end toothing can provide a very narrow engagement angle.

The configuration of the rotor-side toothed disk device 20 in the accommodation 15 in the rotor provides a compact hub 1, in which the rotor-side toothed disk device 20 is guided in the inner radial toothing 13 of the rotor. This provides a high quality, axial guiding. The large diameter of the radial toothing and thus of the axial guide prevents tilting and jamming and provides for a reliable function.

While a particular embodiment of the present hub, in particular for bicycles have been described herein, it will be appreciated by those skilled in the art that changes and modifications may be made thereto without departing from the invention in its broader aspects and as set forth in the following claims.

List of reference numerals:

| | | | |
|---|---|---|---|
| 1 | hub | 143a | length of 143 |
| 2 | hub shell | 145 | diameter of 143 |
| 2a | hub flange | 147 | tolerance of 142/122 |
| 2b | hub flange | 148 | tolerance of 143/123 |
| 3 | plane of cross section, plane of rolling member | 15 | accommodation |
| | | 16 | hub-side rotor bearing |
| 3a | distance of 3, 4 | 16a | axial width |
| 3b | distance 3, 30d | 16b | external diameter |
| 4 | plane of cross section, plane of rolling member | 17 | outer rotor bearing |
| | | 18 | inner radial wall |
| 4b | distance 4, 20d | 19 | outer wall |
| 5 | hub axle | 20 | rotor-side toothed disk device |
| 5a | through hole | | |
| 6 | rotor-side hub bearing | 20a | external diameter |
| 6a | axial width | 20b | axial width |
| 6b | external diameter | 20c | clear inner diameter |
| 7 | outer hub bearing | 20d | central plane of cross section |
| 8 | roller bearing | | |
| 8a | rolling member | 21 | engagement body |
| 8b | axial width | 21a | axial extension |
| 8c | diameter 8a | 22 | end toothing |
| 9 | freewheel device | 22a | external diameter |
| 10 | rotor | 22b | radial height |
| 10a | hub-side end face | 23 | radial toothing |
| 10b | sprocket accommodation | 23a | axial length |
| 10c | outer diameter 10b | 24 | biasing device |
| 11 | rotor body | 24a | holder |
| 11a | hub-side end | 25 | fitted length |
| 11b | outer end | 26, 27 | bearing distance |
| 11c | conical portion | 28 | distance |
| 12 | first rotor part | 29 | distance |
| 121 | connecting area | 30 | hub-side toothed disk device |
| 121a | length of 121 | | |
| 122 | threaded area | 30a | external diameter |
| 122a | length of 122 | 30b | axial width |
| 123 | guiding area | 30c | clear inner diameter |
| 123a | length of 123 | 30d | central plane of cross section |
| 13 | inner radial toothing | | |
| 14 | second rotor part | 31 | engagement body |
| 141 | connecting portion | 31a | axial extension |
| 141a | length of 141 | 32 | end toothing |
| 142 | threaded portion | 32b | radial height |
| 142a | length of 142 | 33 | radial toothing |
| 143 | guiding portion | 33a | axial length |
| 33b | outer coupling contour | 59 | clamping axle |
| 33c | outer periphery | 59a | end piece |
| 34 | biasing device | 59b | diameter |
| 35 | accommodation | 60 | end portion |
| 36 | inner wall | 60a | hub-side end (60) |
| 37 | wall | 60b | other end of 60 |
| 38 | brake disk accommodation | 61 | diameter |
| | | 62 | groove |
| 40 | threaded ring | 63 | enlarged diameter area |
| 40a | rotor-side end, axially outer surface | 65 | sealing device |
| | | 66 | inner sealing gap |
| 40b | hub-side end, axially inner surface | 66a | cone gap |
| | | 66b | clear gap width |
| 40c | central through hole | 67 | outer sealing gap |
| 40d | inner contour of 40 | 67a | clear dimension |
| 41 | external thread | 68 | sealing unit |
| 41a, b | thread groove | 69 | ring portion |
| 41c | axial length | 70 | sealing lip/elastic wall |
| 41d | outer contour | | |
| 42 | axial width | 70a | external diameter |
| 43 | inner radial toothing | 100 | bicycle |
| 43a | axial length | 101 | wheel, front wheel |
| 43b | inner coupling contour | 102 | wheel, rear wheel |
| 44 | central depression, conical depression | 103 | frame |
| | | 104 | fork, suspension fork |
| 44a | angle | 105 | rear wheel damper |
| 44b | depth | 106 | handlebar |
| 44c | height | 107 | saddle |
| 44d | stepped depression | 109 | spoke |
| 45 | (conical) support portion | 110 | rim |
| | | 111 | sprocket assembly |
| 45a | angle | 112 | pedal crank |
| 46 | sealing wall | F | freewheeling position |
| 47 | sealing groove | E | engagement position |
| 47a | diameter | | |

-continued

| List of reference numerals: | |
|---|---|
| 48 | thread in 2 |
| 49a, b | thread groove |
| 50, 51 | limit stop |
| 52 | sleeve body |
| 53 | spacer |
| 54, 55 | radial bulges |
| 54a | shoulder |
| 55a | shoulder |
| 56 | accommodating contour (conical) |
| 58 | clamping mechanism |

The invention claimed is:

1. A hub for at least partially muscle-powered vehicles, comprising a hub axle; a hub shell; a rotor; and a freewheel device, wherein the hub shell is supported for rotation with at least two axially spaced apart hub bearings, namely, at least one rotor-side hub bearing disposed closer to the rotor and at least one outer hub bearing further distant from the rotor;

and wherein the rotor is supported for rotation with at least two axially spaced apart rotor bearings, namely, one hub-side rotor bearing disposed closer to the hub shell and at least one outer rotor bearing further distant from the hub shell;

and wherein the freewheel device comprises a hub-side toothed disk device coupled with the hub shell, and a rotor-side toothed disk device interacting therewith and coupled with the rotor, each comprising an end toothing to engage with one another, and biased to an engagement position by means of at least one biasing device, wherein the end toothing of the hub-side toothed disk device is axially oriented to the rotor;

and wherein the rotor-side toothed disk device is accommodated radially within the rotor, and by way of an outer radial toothing with an inner radial toothing in the rotor is coupled with the rotor in a rotationally fixed manner in the driving direction, and wherein the end toothing of the rotor-side toothed disk device is axially oriented to the hub shell;

and wherein a clear inner diameter of the rotor-side toothed disk device is larger than an outer diameter of the hub-side rotor bearing;

wherein at least one toothed disk device comprises an engagement body, on which the end toothing is configured over a radial height, and the radial toothing is configured over an axial length, wherein the axial length is larger than the radial height; and wherein the distance of two planes of cross section is smaller than the axial length of the radial toothing of an engagement body of at least one toothed disk device.

2. The hub according to claim 1, wherein at least the end toothing of the rotor-side toothed disk device is received radially within the hub shell.

3. The hub according to claim 2, wherein the rotor-side toothed disk device, the hub-side rotor bearing, and a rotor-side hub flange on the hub shell, are located on a shared plane of cross section transverse to a longitudinal extension of the hub axle.

4. The hub according claim 1, wherein the hub-side toothed disk device is accommodated radially within the hub shell and is coupled to the hub shell in a rotationally fixed manner in the driving direction via an outer radial toothing on the hub-side toothed disk device, with an inner radial toothing in the hub shell, and wherein both the hub-side toothed disk device and the rotor-side toothed disk device can be transferred from an engagement position to a freewheel position, each against a biasing force of at least one biasing device.

5. The hub according to claim 1, wherein the clear inner diameter of the hub-side toothed disk device is larger than the outer diameter of the rotor-side hub bearing.

6. The hub according to claim 1, wherein at least one hub bearing and at least one rotor bearing are configured as a roller bearing, each provided with a plurality of rolling members;

wherein a central plane of cross section through the rotor-side toothed disk device intersects the rolling members of the hub-side rotor bearing;

and wherein a central plane of cross section through the hub-side toothed disk device intersects the rolling members of the rotor-side hub bearing.

7. The hub according to claim 6, wherein the axial distance of the central plane of cross section through the rotor-side toothed disk device, from the plane of cross section through the rolling members of the hub-side rotor bearing, is smaller than a diameter or a radius of a rolling member.

8. The hub according to claim 1, wherein an outer diameter of the rotor-side toothed disk device and/or an outer diameter of the end toothing of the rotor-side toothed disk device is larger than an outer diameter of a sprocket accommodation.

9. The hub according to claim 1, wherein the hub-side toothed disk device comprises an outer radial toothing, which is engaged in an inner radial toothing in the hub shell, relative to which it is axially movable;

and wherein the inner radial toothing, with which the outer radial toothing of the hub-side toothed disk device interacts, is configured on a threaded ring screwed into the hub shell.

10. The hub according to claim 9, wherein the threaded ring on the axially outer surface has a central depression, into which a conical portion configured on the end face of the rotor plunges contactless.

11. The hub according to claim 9, wherein the threaded ring has a support portion on the axially inner surface facing away from the rotor, which support portion bears against a correspondingly configured accommodation in the hub shell.

12. The hub according to claim 9, wherein the threaded ring is wider in an axial direction on the radially outer surface than on the radially inner surface.

13. The hub according to claim 1, wherein the external thread of the threaded ring extends axially outwardly beyond the hub-side toothed disk device and up to radially beyond the rotor-side toothed disk device, which the threaded ring partially overlaps.

14. The hub according to claim 1, wherein the axial extension of the engagement body is larger than at least an axial width of a rolling member.

15. The hub according to claim 1, wherein the distance of the two planes of cross section is smaller than an axial width of both the toothed disk devices in the engaged position of the threaded ring.

16. The hub according to claim 1, wherein the hub-side toothed disk device and the rotor-side toothed disk device are configured substantially the same;

wherein at least one biasing device is assigned to each of the two toothed disk devices, which floatingly urge the toothed disk devices to one another;

and wherein both the biasing devices are configured substantially the same.

17. A hub for at least partially muscle-powered vehicles, comprising a hub axle;

a hub shell; a rotor; and a freewheel device, wherein the hub shell is supported for rotation with at least two axially spaced apart hub bearings, namely, at least one rotor-side hub bearing disposed closer to the rotor and at least one outer hub bearing further distant from the rotor;

and wherein the rotor is supported for rotation with at least two axially spaced apart rotor bearings, namely, one hub-side rotor bearing disposed closer to the hub shell and at least one outer rotor bearing further distant from the hub shell;

and wherein the freewheel device comprises a hub-side toothed disk device coupled with the hub shell, and a rotor-side toothed disk device interacting therewith and coupled with the rotor, each comprising an end toothing to engage with one another, and biased to an engagement position by means of at least one biasing device, wherein the end toothing of the hub-side toothed disk device is axially oriented to the rotor;

and wherein the rotor-side toothed disk device is accommodated radially within the rotor, and by way of an outer radial toothing with an inner radial toothing in the rotor is coupled with the rotor in a rotationally fixed manner in the driving direction, and wherein the end toothing of the rotor-side toothed disk device is axially oriented to the hub shell;

wherein a clear inner diameter of the rotor-side toothed disk device is larger than an outer diameter of the hub-side rotor bearing;

wherein at least one hub bearing and at least one rotor bearing are configured as a roller bearing, each provided with a plurality of rolling members;

wherein a central plane of cross section through the rotor-side toothed disk device intersects the rolling members of the hub-side rotor bearing;

wherein a central plane of cross section through the hub-side toothed disk device intersects the rolling members of the rotor-side hub bearing; and wherein the axial distance of the central plane of cross section through the rotor-side toothed disk device, from the plane of cross section through the rolling members of the hub-side rotor bearing, is smaller than a diameter or a radius of a rolling member.

18. A hub for at least partially muscle-powered vehicles, comprising a hub axle;

a hub shell; a rotor; and a freewheel device, wherein the hub shell is supported for rotation with at least two axially spaced apart hub bearings, namely, at least one rotor-side hub bearing disposed closer to the rotor and at least one outer hub bearing further distant from the rotor;

and wherein the rotor is supported for rotation with at least two axially spaced apart rotor bearings, namely, one hub-side rotor bearing disposed closer to the hub shell and at least one outer rotor bearing further distant from the hub shell;

and wherein the freewheel device comprises a hub-side toothed disk device coupled with the hub shell, and a rotor-side toothed disk device interacting therewith and coupled with the rotor, each comprising an end toothing to engage with one another, and biased to an engagement position by means of at least one biasing device, wherein the end toothing of the hub-side toothed disk device is axially oriented to the rotor;

wherein the rotor-side toothed disk device is accommodated radially within the rotor, and by way of an outer radial toothing with an inner radial toothing in the rotor is coupled with the rotor in a rotationally fixed manner in the driving direction, and wherein the end toothing of the rotor-side toothed disk device is axially oriented to the hub shell;

wherein a clear inner diameter of the rotor-side toothed disk device is larger than an outer diameter of the hub-side rotor bearing; and wherein an outer diameter of the rotor-side toothed disk device and/or an outer diameter of the end toothing of the rotor-side toothed disk device is larger than an outer diameter of a sprocket accommodation.

* * * * *